US010810179B2

(12) United States Patent
Risvik et al.

(10) Patent No.: US 10,810,179 B2
(45) Date of Patent: Oct. 20, 2020

(54) DISTRIBUTED GRAPH DATABASE

(71) Applicant: Microsoft Technology Licensing, LLC, Redmond, WA (US)

(72) Inventors: Knut Magne Risvik, Mo I Rana (NO); Ming-Chuan Wu, Bellevue, WA (US); Dushyanth Narayanan, Cambridge (GB); Matthew Renzelmann, Redmond, WA (US); Alexander Shamis, Seattle, WA (US); Miguel Oom Temudo De Castro, Cambridge (GB); Aleksandar Dragojevic, Cambridge (GB); Chiranjeeb Buragohain, Issaquah, WA (US); Richendra Khanna, Seattle, WA (US); Timothy Tan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 810 days.

(21) Appl. No.: 15/154,370

(22) Filed: May 13, 2016

(65) Prior Publication Data

US 2017/0091246 A1 Mar. 30, 2017

Related U.S. Application Data (63) Continuation of application No. 62/233,246, filed on Sep. 25, 2015.

(51) Int. Cl.
*G06F 16/22* (2019.01)
*G06F 16/901* (2019.01)
(Continued)

(52) U.S. Cl.
CPC ........ *G06F 16/2272* (2019.01); *G06F 16/182* (2019.01); *G06F 16/22* (2019.01);
(Continued)

(58) Field of Classification Search
CPC ................................................ G06F 17/30336
See application file for complete search history.

(56) References Cited

U.S. PATENT DOCUMENTS 7,451,359 B1 * 11/2008 Coekaerts ........... G06F 11/0709
709/223
8,949,250 B1 2/2015 Garg et al.
(Continued)

FOREIGN PATENT DOCUMENTS

EP 3296896 B1 * 5/2019

OTHER PUBLICATIONS

Herlihy et al., "Hopscotch Hashing", Sep. 2008 (Year: 2008).*
(Continued)

*Primary Examiner* — Dawaune A Conyers
(74) *Attorney, Agent, or Firm* — Schwegman Lundberg & Woessner, P.A.

(57) ABSTRACT

A distributed graph database that enables scaling and efficient processing is described. The distributed graph database can, for example, scale up to petabytes of data to enable transactional processing of graph data with low latency and low processing overhead. The distributed graph database can include a cluster of devices and a remote direct memory access (RDMA)-based communication layer to perform low latency messaging between devices of the cluster of devices. Additionally, the distributed graph database can include a shared memory layer that provides one or more data structures, a transaction layer to facilitate query processing, and a graph database layer stored in computer-readable media and executed on a processor to implement a graph data model. In at least one example, the graph data model can be mapped to the one or more data structures.

22 Claims, 6 Drawing Sheets

(51) Int. Cl.
  *G06F 16/25* (2019.01)
  *G06F 16/27* (2019.01)
  *G06F 16/182* (2019.01)
  *G06F 16/2458* (2019.01)
  *H04L 29/08* (2006.01)

(52) U.S. Cl.
  CPC ...... *G06F 16/2237* (2019.01); *G06F 16/2246* (2019.01); *G06F 16/2255* (2019.01); *G06F 16/2471* (2019.01); *G06F 16/25* (2019.01); *G06F 16/27* (2019.01); *G06F 16/9024* (2019.01); *H04L 67/1097* (2013.01)

(56) References Cited

U.S. PATENT DOCUMENTS

| | | | |
|---|---|---|---|
| 9,767,197 B1* | 9/2017 | Agarwal | G06F 17/30864 |
| 2007/0203944 A1 | 8/2007 | Batra et al. | |
| 2008/0155537 A1 | 6/2008 | Dinda et al. | |
| 2010/0050179 A1 | 2/2010 | Mohindra et al. | |
| 2011/0258391 A1* | 10/2011 | Atkisson | G06F 11/108 |
| | | | 711/118 |
| 2013/0103904 A1 | 4/2013 | Pangborn et al. | |
| 2014/0019490 A1* | 1/2014 | Roy | G06F 16/2228 |
| | | | 707/798 |
| 2015/0066524 A1* | 3/2015 | Fairbrothers | G16H 10/60 |
| | | | 705/2 |
| 2015/0067857 A1 | 3/2015 | Symons et al. | |
| 2015/0095348 A1* | 4/2015 | Presta | G06F 17/30958 |
| | | | 707/748 |
| 2015/0100574 A1* | 4/2015 | Presta | G06F 16/278 |
| | | | 707/737 |
| 2015/0150017 A1* | 5/2015 | Hu | G06F 12/00 |
| | | | 718/103 |
| 2015/0186331 A1* | 7/2015 | Gao | G06F 15/167 |
| | | | 709/212 |
| 2015/0186427 A1 | 7/2015 | Logothetis et al. | |
| 2015/0212892 A1* | 7/2015 | Li | G06F 9/3863 |
| | | | 707/649 |
| 2015/0242324 A1* | 8/2015 | Novakovic | G06F 12/0813 |
| | | | 711/121 |
| 2016/0117414 A1* | 4/2016 | Verma | G06F 16/9024 |
| | | | 707/798 |
| 2016/0154834 A1* | 6/2016 | Friedman | G06F 17/30327 |
| | | | 707/657 |
| 2016/0328488 A1* | 11/2016 | Lytle | G06F 9/54 |
| 2016/0366216 A1* | 12/2016 | Hack | H04L 67/1095 |

OTHER PUBLICATIONS

Graefe, "A Survey of B-Tree Locking Techniques", 2010 (Year: 2010).*
Xia et al., "Explore Efficient Data Organization for Large Scale Graph Analytics and Storage", 2014 (Year: 2014).*
Merrill et al., "High Performance and Scalable GPU Graph Traversal", Aug. 2011 (Year: 2011).*
"International Search Report and Written Opinion for PCT/US2016/053597" dated Nov. 23, 2016, 14 pages.
CSAIL Calendar: FARM: Fast Available Remote Memory; Aug. 25, 2014—FARM: Fast Available Remote Memory. Speaker: Miguel Castro , MSR Cambridge, UK. Date: Friday, Sep. 5, 2014, 1 page.
Dragojevic, et al. "Farm: Fast Remote Memory", in the Proceedings of the 11th USENIX Symposium on Networked Systems Design and Implementation (NSDI '14). Available at <https://www.usenix.org/conference/nsdi14/technical-sessions/dragojevic> Apr. 2014. 15 pages.

* cited by examiner

DISTRIBUTED GRAPH DATABASE

RELATED APPLICATION

This application is a non-provisional of and claims the benefit of U.S. Provisional Application 62/233,246, filed on Sep. 25, 2015 titled "High Performance Distributed Graph Database," which is incorporated by reference herein.

BACKGROUND

Graph data is ubiquitous in large internet scale processes. For instance, graph data is present in social graphs used by the likes of FACEBOOK®, TWITTER®, etc. Alternatively, graph data can be used for systems such as PAYPAL® payments (with multiple user accounts connected by payment transactions), online document corpuses such as GOOGLE® Docs or MICROSOFT OFFICE 365® (where documents are connected to users who are in turn connected to other users via email or professional links), etc. Storing and processing data represented as a structure of connected data (e.g., a graph) can involve scaling out to a large cluster of devices. Generally, processing across devices causes added latency and cost of coordination. Current techniques partition datasets to avoid cross-device computation. However, such techniques are not scalable and/or involve high latency.

SUMMARY

A distributed graph database that enables scaling and efficient processing is described herein. In at least one example, the distributed graph database can scale up to petabytes of data to enable transactional processing of graph data with low latency and low processing overhead. The distributed graph database can include a cluster of devices and a remote direct memory access (RDMA)-based communication layer to perform low latency messaging between devices of the cluster of devices. Additionally, the distributed graph database can include a shared memory layer that provides one or more data structures, a transaction layer that can facilitate query processing, and a graph database layer stored in computer-readable media and executed on a processor to implement a graph data model. In at least one example, the graph data model can be mapped to the one or more data structures.

In at least one example, techniques described herein include leveraging fast remote memory (FaRM), a memory distributed computing platform that can utilize RDMA communication to improve latency and throughput over other memory systems, such as those that use Transmission Control Protocol/Internet Protocol (TCP/IP). In at least one example, the techniques described herein can distribute a data structure across a cluster of devices in a shared transactional memory layer (e.g., FaRM) and can generate a graph based at least in part on the data structure. The techniques described herein can further include receiving a transaction to be executed against the graph and using RDMA to execute the transaction against the graph.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

DETAILED DESCRIPTION

Technologies described herein are directed to a distributed graph database that enables scaling and efficient processing. The distributed graph database can, for example, scale up to petabytes of data to enable transactional processing of graph data with low latency and low processing overhead. In at least one example, a cluster of devices connected with Remote Direct Memory Access (RDMA) capable networks can be used to create a distributed transactional memory fabric. For the purpose of this discussion, RDMA enables a device to access (e.g., read from, write to, etc.) memory on a remote device without interrupting processing being performed by processors on the remote device. That is, RDMA is a networking abstraction that can provide direct access to memory on a remote device. As described herein, in some examples, data can be stored in memory of a first device and access to remote device(s) can be done through a high speed RDMA network within the distributed graph database.

In at least one example, techniques described herein include leveraging fast remote memory (FaRM), a memory distributed computing platform that can utilize RDMA communication to improve latency and throughput over other memory systems, such as those that use Transmission Control Protocol/Internet Protocol (TCP/IP). In such examples, FaRM can leverage memory of a cluster of devices to generate a shared address space. Applications and/or modules associated with individual devices of the cluster of devices can allocate, read from, write to, free, etc. objects in the shared address space. In at least one example, FaRM can correspond to Petabyte Transactional Memory (PTM), which can be used to provide a petabyte sized memory pool across a cluster of devices, as described above. Further, in some examples, FaRM can provide transactions that allow updates to sets of objects together with atomicity, consistency, isolation, and durability (ACID) guarantees. FaRM can utilize efficient RDMA-based communication. In some examples, FaRM can leverage a kernel driver and changes to a network interface card (NIC) driver. In additional and/or alternative examples, FaRM can implement efficient non-uniform memory access (NUMA)-aware multiplexing of connections to improve performance.

In at least one example, FaRM can include data structures such as lists (e.g., linked lists, etc.), catalogs, trees (e.g., b-trees, etc.), hash tables and/or maps, etc., as described below. In some examples, the data structures representing hash tables and b-trees can reduce and/or eliminate the need for processor-based coordination of processing. The techniques described herein can leverage the data structures to build a connected graph data model (i.e., a graph) that can be stored in a graph database and can allow transactional processing of graph data across the cluster of devices with very low latency and very low processing overhead. That is, in at least one example, the graph(s) stored in the graph database can be mapped down to the RDMA optimized data structures (e.g., lists (e.g., linked lists, etc.), catalogs, trees (e.g., b-trees, etc.), hash tables and/or maps, etc.). Additionally and/or alternatively, the graph(s) stored in the graph database can utilize custom data structures that can be built on FaRM that can be optimized for graph operations (e.g., traversal). As a result, the use of FaRM can reduce latency and computational consumption and can optimize bandwidth availability.

In at least one example, in-memory data, as described herein, in the distributed graph database, can support orders of magnitude higher input/output (I/O) throughput compared to disk resident data. For example, FaRM can perform more than one million transactions per second on a single device in the cluster of devices described above. In at least one example, I/O intensive graph workloads, such as breadth-first-search (BFS), depth-first-search (DFS) queries, A* queries, subgraph-match queries, etc., can be matched to the underlying storage infrastructure (e.g., connected graph data model) described herein. Additionally and/or alternatively, based at least in part on using RDMA to perform remote reads, techniques described herein minimize network data transfers based at least in part on careful data placement (e.g., collocating frequently accessed graph objects together in a single device) and query shipping to perform queries on a device storing the data. In at least one example, combining RDMA reads and query shipping can improve performance when compared to using either RDMA reads or query shipping exclusively.

As described herein, the distributed graph database can include one or more graphs, which can include a set of vertices connected by directed edges. Both vertices and edges can carry a payload with arbitrary schema structures (e.g., key-value pairs, etc.). Furthermore, indices can be created on any part or composite of the payload to increase the speed of query execution. In some examples, the distributed graph database can present a language independent remote procedure call (RPC) interface to various devices by which the devices can directly operate on vertices, edges, or the data stored therein.

In at least one example, the distributed graph database can support a query language to support BFS queries, DFS queries, A* queries, subgraph queries, etc. In some examples, the distributed graph database can run as a single process per device with FaRM linked in as a library which can provide storage and communication facilities. In other examples, queries submitted to the distributed graph database can be broken down into multiple subqueries which can be run in parallel across the cluster of devices to speedup overall execution time. In at least one example, the distributed graph database can leverage a query planner which is aware of data locality to intelligently partition user queries. In some examples, module(s) associated with FaRM can leverage the distributed graph database to implement iterative computation including, but not limited to, PageRank, clustering, belief propagation, etc.

Figure 1:
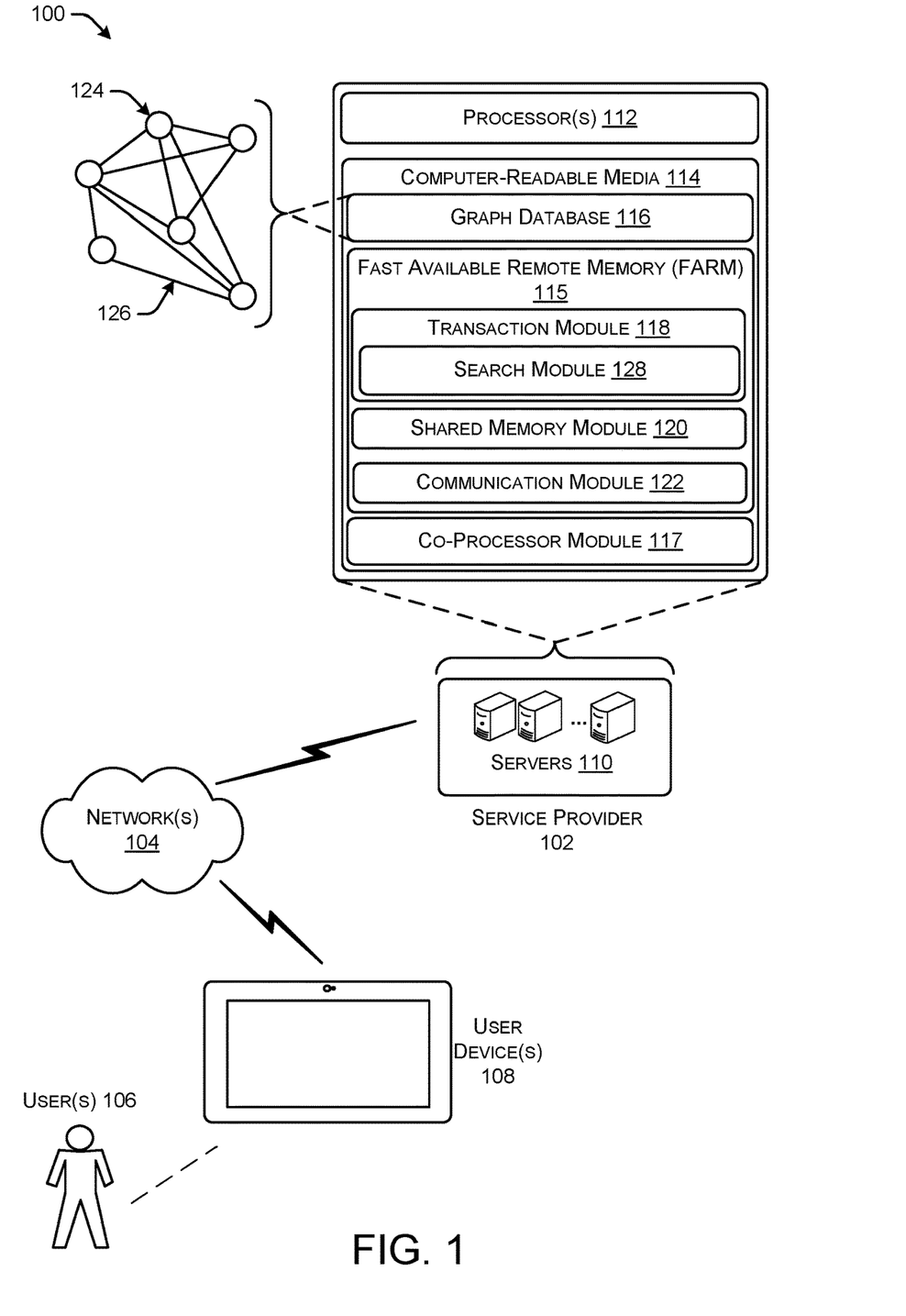
FIG. 1 is a schematic diagram showing an example environment associated with a high performance and scalable distributed graph database.

FIG. 1 illustrates an example environment 100 associated with a high performance and scalable distributed graph database. More particularly, the example environment 100 can include a service provider 102, one or more networks 104, one or more users 106, and one or more devices 108 associated with the one or more users 106.

The service provider 102 can be any entity, server(s), platform, console, computer, etc., that can enable transactional processing of graph data across clusters of devices with low latency and low processing overhead. The service provider 102 can be implemented in a non-distributed computing environment or can be implemented in a distributed computing environment, possibly by running some modules on devices 108 or other remotely located devices. As shown, the service provider 102 can include one or more server(s) 110, which can each include one or more processing unit(s) (e.g., processor(s) 112) and computer-readable media 114, such as memory. As described above, in at least one example, computer-readable media 114 associated with a cluster of servers 110 can be distributed across the cluster of servers 110 to generate a shared address space. In at least one example, techniques described herein include leveraging fast remote memory (FaRM), a memory distributed computing platform that can utilize RDMA communication, to leverage the shared address space to improve latency and throughput over other memory systems, such as those that use Transmission Control Protocol/Internet Protocol (TCP/IP). In such examples, applications and/or modules associated with individual server(s) of the cluster of servers 110 can allocate, read from, write to, free, etc. objects in the shared address space.

In some examples, the networks 104 can be any type of network known in the art, such as the Internet. As described above, in at least one example, the networks can be RDMA capable networks used to create a distributed transactional memory fabric. Examples of networks that are capable of supporting RDMA include, but are not limited to, InfiniBand (IB) networks, RDMA Over Converged Ethernet (RoCE) networks, Internet Wide Area RDMA Protocol (iWARP), etc. In additional and/or alternative examples, the one or more server(s) 110 and/or devices 108 can communicatively couple to the networks 104 in any manner, such as by a global or local wired or wireless connection (e.g., local area network (LAN), intranet, Bluetooth, etc.). The networks 104 can facilitate communication between the server(s) 110 and/or the devices 108.

Examples support scenarios where the one or more server(s) 110 can include one or more computing devices that operate in a cluster (e.g., the cluster of devices described above and below) or another grouped configuration to share resources, balance load, increase performance, provide failover support or redundancy, or for other purposes. Device(s) represented by the one or more server(s) 110 can include any type of computing device having one or more processing unit(s) (e.g., processor(s) 112) operably connected to computer-readable media 114 such as via a bus, which in some instances can include one or more of a system bus, a data bus, an address bus, a PCI bus, a Mini-PCI bus, and any variety of local, peripheral, and/or independent buses. Executable instructions stored on computer-readable media 114 can include, for example, FaRM 115, as described above, a graph database 116, and a co-processor module 117. FaRM 115 can include a transaction module 118, a shared memory module 120, a communication module 122, and/or applications (not shown) that can be loadable and executable by the processor(s) 112. FaRM, as used herein and described above, refers to a transactional memory fabric that can utilize an allocation model with the addition of using persistent storage (e.g., solid-state drive (SSD), nonvolatile random-access memory (NVRAM), etc.) for a layer of replication and transaction protocol. Additional details about FaRM 115 are described below.

Alternatively, or in addition, the functionality described herein can be performed, at least in part, by one or more hardware logic components such as accelerators. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip Systems (SOCs), Complex Programmable Logic Devices (CPLDs), etc. Device(s) represented by the one or more server(s) 110 can further include one or more input/output (I/O) interface(s) coupled to the bus to allow device(s) to communicate with other devices such as input peripheral devices (e.g., a keyboard, a mouse, a pen, a game controller, a voice input device, a touch input device, gestural input device, a tracking device, a mapping device, an image camera, a depth sensor, a physiological sensor, and the like) and/or output peripheral devices (e.g., a display, a printer, audio speakers, a haptic output, and the like). Such network interface(s) can include one or more network interface controllers (NICs) or other types of transceiver devices to send and receive communications over a network. For simplicity, some components are omitted from the illustrated environment.

Processing unit(s) (e.g., processor(s) 112) can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In various examples, the processing unit(s) (e.g., processor(s) 112) can execute one or more modules and/or processes to cause the server(s) 110 to perform a variety of functions, as set forth above and explained in further detail in the following disclosure. Additionally, each of the processing unit(s) (e.g., processor(s) 112) can possess its own local memory, which also can store program modules, program data, and/or one or more operating systems.

In at least one configuration, the computer-readable media 114 of the server(s) 110 can include components that facilitate transactional processing of graph data across a cluster of servers 110 with low latency and low processing overhead. For example, the computer-readable media 114 can include FaRM 115, the graph database 116, and the co-processor module 117. FaRM 115 can include one or more modules, such as the transaction module 118, the shared memory module 120, and the communication module 122, as described above. Each of the modules (116, 117, 118, 120, and 122) can include components that represent pieces of code executing on a computing device. In at least one example, the components can facilitate generating graphs and processing the graphs to facilitate transactions, as described below. In at least some examples, the modules (116, 117, 118, 120, and 122) can be implemented as computer-readable instructions, various data structures, and so forth via at least one processing unit(s) (e.g., processor(s) 112) to enable transactional processing of graph data across a cluster of servers 110 with low latency and low processing overhead. In some examples, a module can include an Application Program Interface (API) to perform some or all of its functionality (e.g., operations). In at least one example, the computer-readable media 114 of the server(s) 110 can facilitate interaction between the service provider 102 and the one or more devices 108. Functionality to perform these operations can be included in multiple devices or a single device.

Depending on the exact configuration and type of the server(s) 110, the computer-readable media 114 can include computer storage media and/or communication media. Computer storage media can include volatile memory, non-volatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media can embody computer readable instructions, data structures, program modules, or other data in a modulated data signal, such as a carrier wave, or other transmission mechanism. The term "modulated data signal" means a signal that has one or more of its characteristics set or changed in such a manner as to encode information in the signal. Such signals or carrier waves, etc. can be propagated on wired media such as a wired network or direct-wired connection, and/or wireless media such as acoustic, RF, infrared and other wireless media. As defined herein, computer storage media does not include communication media. That is, computer storage media does not include communications media consisting solely of a modulated data signal, a carrier wave, or a propagated signal, per se.

The graph database 116 can include a graph data model. The graph data model can include one or more graphs each comprising graph objects with a set of properties. For the purpose of this discussion, graph objects can include vertices 124 and edges 126. In at least one example, the edges 126 can be directed edges 126 connecting pairs of the vertices 124. Each of the graph objects can correspond to a FaRM object, described below, which can be uniquely identified by a FaRM pointer. In at least one example, a FaRM pointer can be a reference data type having a value that refers to or points to another value stored somewhere in FaRM 115. That is, a FaRM pointer can reference a location in FaRM 115. In a non-limiting example, FaRM pointer can be a 128 bit object which is made up of at least three parts: region identifier (32 bit), offset (32 bit), incarnation (64 bit), etc. The region identifier can identify which FaRM region a graph object is located in and hence serves as routing information to look up the graph object. The offset can identify, within the region, the offset where the graph object can be found. In at least one example, FaRM 115 can use one-way RDMA to read remote graph objects without any processor intervention. In such examples, object incarnation can enable the graph database 116 to detect if a graph object has been deleted. For example, when a graph object is first allocated, its incarnation is set to zero and when it is marked as deleted, its incarnation is incremented. Therefore when a graph object is read using a FaRM pointer, its incarnation indicates whether it is still valid or not. As the graph object goes through cycles of allocation/deallocation the incarnation keeps growing. In additional and/or alternative examples, FaRM 115 can provide the transaction module 118 with a snapshot view of the graph database 116. In such examples, the transaction module 118 may not observe modifications (e.g., deletions, etc.) by concurrently running transactions and may not rely on object incarnations.

As described above, FaRM 115 can include one or more modules, such as the transaction module 118, the shared memory module 120, and the communication module 122. Each FaRM object is stored in memory in a unique server of the cluster of servers 110 known as the primary server for that object. For the purpose of this discussion, FaRM objects can be a plurality of bytes that are grouped, or otherwise contained, such that FaRM pointers to various FaRM objects can be used to build data structures that are representative of graphs, graph objects (e.g., vertices, edges, etc.), schema, etc. that are stored in FaRM 115. Backup copies of FaRM objects can be stored either in memory or in persistent storage of one or more secondary servers of the plurality of servers 110. In at least one example, every FaRM object read can be served from the primary server and hence reading from the primary server can be the fastest way to access such FaRM objects. Therefore, various principles can be utilized for data layout, including locality and batching.

FaRM objects which are frequently accessed together can be located close together. For example, edges of a vertex in a list can be stored such that a vertex is located within a threshold proximity of an edge list based on the principle of locality. FaRM provides the ability to allocate a new FaRM object within a threshold distance of an existing FaRM object. In at least one example, the location of two FaRM objects can be tiered where, for example, an attempt is first made to place a FaRM object on a same region as another specified FaRM object, and if that is not possible, an attempt is made to place FaRM object in another region on the same server, and if that fails, an attempt is made to place FaRM object in another server on the same physical rack, and so on. In some examples, FaRM can provide users 106 the ability to specify data partitions, which can be mapped internally to locality groups that can be kept close to each other.

To exploit locality in data placement, the technologies described herein can leverage a combination of approaches. For small graphs, FaRM 115 can locate all data on the same region or server of the plurality of servers 110. For larger graphs, FaRM 115 can partition the data based on heuristics, such as, for example, customer zip code, or other indicators of data locality, identified using hints provided by a user 106. In some examples, FaRM 115 can traverse a graph and move data around to improve locality. Such examples can be useful for stable graphs which can require more read operations compared to changes in the graphs. In at least one example, although two regions which are located on the same server are within a predetermined proximity, the two regions can be moved around after server failure and load balancing thereby causing the two regions to potentially be located outside the predetermined proximity (e.g., the two regions can be arranged such that they are no longer close).

As described above, remote access can accrue latency. Accordingly, in some examples, large data transfers can be more efficient than many small data transfers. Therefore, FaRM 115 can leverage data structures, as described herein, which are optimized for as few remote accesses as possible. For instance, b-trees can be optimized for as few remote accesses as possible. Similarly in linked lists, multiple items can be stored on a single node to reduce a number of accesses while traversing the list. Additionally and/or alternatively, hash tables and/or maps can be used to minimize the number of remote accesses required for data transfers.

To take advantage of locality, FaRM 115 can leverage both data shipping and query shipping. In at least one example, when data is local to a server of the plurality of servers 110, FaRM 115 can execute a query locally. Alternatively, for non-local queries, FaRM 115 can ship the query to the remote primary server where it can be executed more efficiently.

The transaction module 118 can be associated with the context and the coordination of various transactions. Transactions can include, but are not limited to, allocating, reading from, writing to, freeing, etc. one or more FaRM objects. In at least one example, the transaction module 118 can facilitate query transactions. In such examples, a search module 128 can utilize the transaction module 118 to perform query processing (e.g., range queries, index queries, etc.), FaRM pointer lookups, scans, etc. In at least one example, the search module 128 can coordinate complex queries. The search module 128 can receive queries from a device 108 associated with a user 106, translate the queries to language-independent representations, and execute the language-independent representations. In at least one example, the search module 128 that can access the graph(s) in the graph database 116 and traverse the graph(s) using one or more traversal algorithms. For instance, the search module 128 can perform BFS traversal, DFS traversal, A* traversal, subgraph-match traversal, etc. of the graph(s). In at least one example, the search module 128 can start at a given vertex of a graph in the graph database 116 and iteratively process vertices in its neighborhood to identify vertices matching certain characteristics.

In a non-limiting example in a social network, like FACEBOOK®, SKYPE®, etc., a user 106 might want to find all friends of friends who live in the same city as the user 106. In such examples, the search module 128 can perform a simple query with a filter for people who match a particular city. In at least one example, the search module 128 can be associated with a single coordinator server which can work both as a query coordinator and as an aggregator. Given an origin vertex, the primary server can be chosen for the vertex as the coordinator server. The filtering criteria within a query might involve filtering against fields specified in the user's data, which can be matched against by deserializing the data using the schema provided by the user 106.

In at least one example, the search module 128 can iteratively traverse a graph using a traversal algorithm, as described above. For instance, in each iteration, the search module 128 can explore one level deeper in graph. As new vertices are explored in the graph, one or more optional filters can be applied to determine whether the new vertex is added to the next iteration or not. For example, if a user 106 is looking for people in the same city as in the previous query, at every level, the search module 128 can filter out vertices which do not belong in that city. For example, on the first iteration, the search module 128 prepares a list of all the neighbor vertices of the origin vertex, and then determines the primary servers for each neighbor. For the purpose of this discussion, the list can be called a neighbor list. In some examples, the neighbor list can be partitioned according to the primary server and then each partition is handed off to the primary server along with any filter that is applied. In addition, the search module 128 can maintain a list of vertices that have already been visited. Every primary server can iterate through the vertices for which the primary server is responsible and for each iteration, the primary server can apply the relevant filter, retrieve the neighbors to each primary server, and return the neighbor list back to the coordinator server. This step can achieve two optimizations: first, the vertex data and neighbor lists are read at the primary server responsible for that vertex and second, it parallelizes the query across a large number of primary servers.

In at least some examples, there can be a tradeoff between the overhead of shipping the list of neighbors to a remote primary server, and using a RDMA read to fetch the vertex data and process it on the coordinator server itself. For small numbers of vertices being visited, performing RDMA reads usually performs much better than shipping the query. However, for large numbers of vertices being visited, shipping the query can be more efficient. Also, performing RDMA reads may perform better than query shipping when the system is fully loaded or the remote primary server is known to be busy with other work. When performing RDMA reads, the work can also be parallelized using local threads on the coordinator server.

Once the neighbor list reaches the coordinator server, or is computed locally, the coordinator adds the neighbors to the list of visited vertices and then prepares a next list of vertices to visit. This way the iteration continues until the search module 128 runs out of neighboring vertices that are accessible from the origin vertex. As an optimization for dealing with laggard hosts, the coordinator server can decide to proceed with processing the next set of vertices when most of the remote hosts have responded. While this might result in some redundant work being done, due to already visited vertices being revisited, it does not affect the correctness. In at least one example, the list of vertices already visited and the neighbor list can be stored in the search module 128. If the coordinator servers crash during the query, the query can be restarted. For larger queries, lists of visited vertices can be kept on each local server of the plurality of servers 110 per query, which can avoid centralized coordination and allow queries to proceed without a synchronization step per level.

Figure 2:
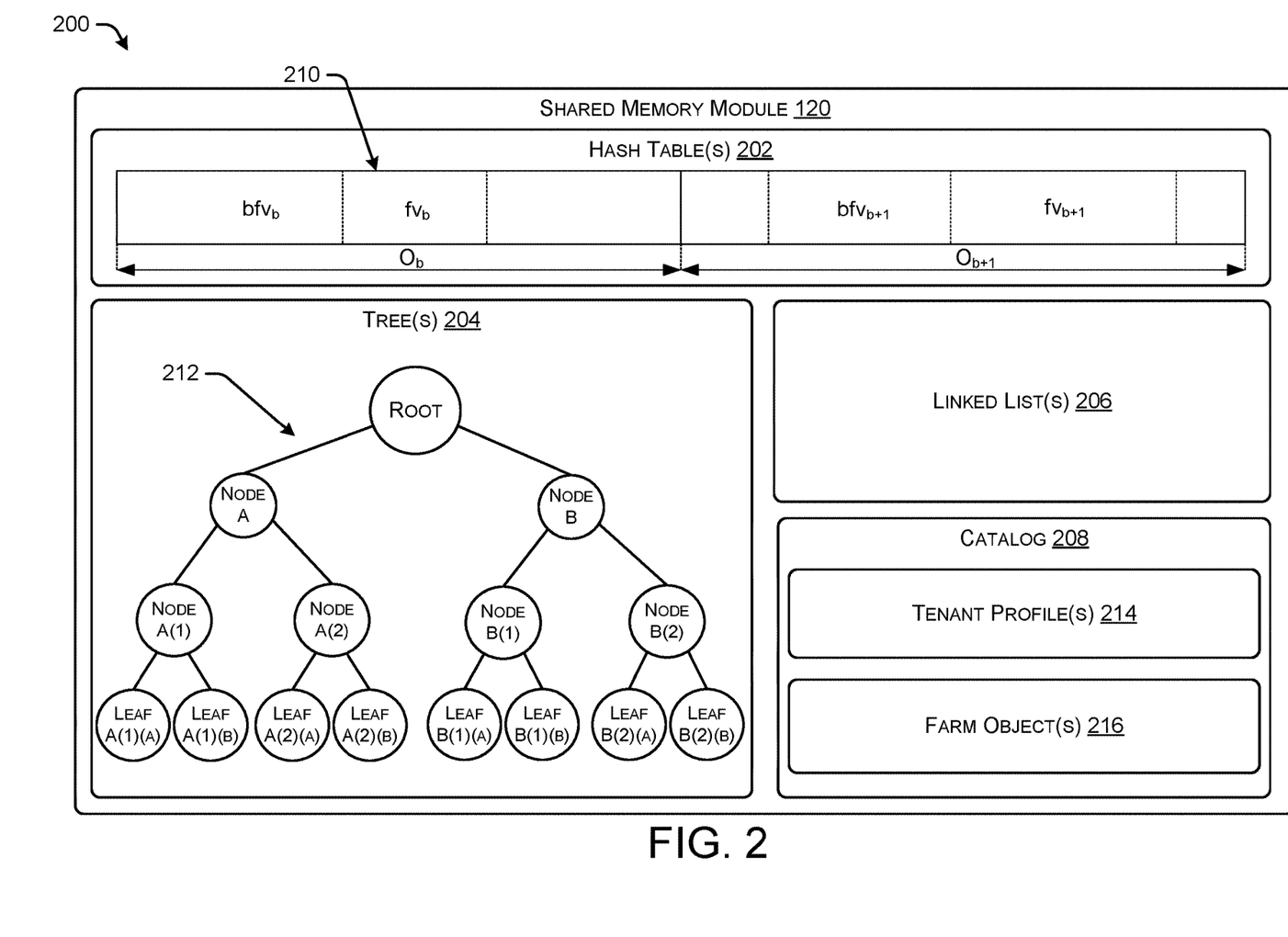
FIG. 2 is a schematic diagram showing an example of data structures that can be associated with a shared memory module of FIG. 1.

The shared memory module 120 can store one or more data structures that can be used for indexing graph objects and retrieving graph objects in a particular order and building a graph. The data structures can include, but are not limited to, hash table(s) 202 and/or map(s), tree(s) 204 (e.g., b-trees, etc.), linked list(s) 206, and a catalog 208. FIG. 2, described below, illustrates an example of data structures that can be associated with the shared memory module 120.

The communication module 122 can be a layer of communication systems that can facilitate remote RDMA reads and/or low latency messaging between individual servers in the cluster of servers 110, as well as reliable replication of memory regions between the individual servers in the cluster of servers 110. In some examples, the remote RDMA reads and/or low latency messaging between individual servers in the cluster of servers 110, as well as reliable replication of memory regions between individual servers in the cluster of servers 110, can be done without involving processors (e.g., processor(s) 112) in the individual server(s) in question. The communication module 122 can be used to create the transactional memory fabric using an allocation model. In at least some examples, the communication module 122 can leverage a persistent storage for one layer of replication and transaction protocol.

The co-processor module 117 can run user code near the graph database 116 to extend the system described herein with user level workloads. As described below, in some examples, the co-processor module 117 can be in FaRM 115. In other examples, the co-processor module 117 can be outside of FaRM 115, as shown in FIG. 1. The co-processor module 117 can utilize different levels of protection. The co-processor module 117 can be executed in different settings, including but not limited to, trusted co-processors, untrusted hosted co-processors, and untrusted frontend (FE)-hosted co-processors. In at least one example, the co-processor module 117 can enable the same workload to be deployed in different settings (e.g., trusted, untrusted, and untrusted FE-hosted) with different protection and/or scaling approaches. In at least some examples, the one or more co-processors can leverage the lower levels of FaRM for storage and processing to expose a public API (by means of an RPC interface).

In an example, trusted co-processors can be a module of native C/C++ code that runs inside FaRM 115. The trusted co-processor has access to APIs provided in FaRM 115. Threads for execution can be provided through the scheduling system in FaRM 115. In at least one example, an untrusted hosted co-processor can be executed in its own process and addressing space. Memory fabric and graph database APIs can be exposed into the untrusted co-processor through a C-level library and various language/runtime bindings (Java, C#, Python, etc.). The process can be created and controlled by a fabric scheduling system associated with FaRM 115. Calls between the untrusted co-processor and FaRM 115 can be done through transparent inter-process messaging in the shared memory module 116. Untrusted frontend (FE)-hosted co-processors can be similar to any device. In some examples, untrusted FE-hosted co-processors can be hosted in separate frontend clusters. Like the untrusted hosted co-processor (UHC), a C-level interface provides access to the core APIs; however, scheduling is not controlled by the fabric. Communication between the untrusted FE-hosted co-processor and the graph database 116 can be done transparently through RPC, keeping semantics and API equal between the untrusted hosted and untrusted FE-hosted co-processors.

FIG. 2 illustrates an example 200 of data structures that can be associated with the shared memory module 120. As described above, the data structures can include, but are not limited to, hash table(s) 202 and/or map(s), tree(s) 204 (e.g., b-trees, etc.), linked list(s) 206, and a catalog 208. In at least one example, hash table(s) 202 can be implemented using a variation of hopscotch hashing. The hash table(s) 202 can provide a faster alternative to b-tree(s) without range iteration. In additional and/or alternative examples, b-tree(s) can provide a key-value store with the ability to iterate over a range. As yet another example, a linked list 206 can provide a list interface with multiple items stored in each vertex of the linked list 206. In at least one example, the technologies described herein can utilize special versions of these data structures that are capable of scaling by using the transactional memory fabric provided, and can be optimized to minimize the number of RDMA operations involved.

In at least one example, the hash table(s) 202 and/or map(s) can include an algorithm called chained associative hopscotch hashing that can achieve balance between space efficiency and the size and number of RDMAs used to perform lookups by combining hopscotch hashing with chaining and associativity. FIG. 2 illustrates an example hash table 210 having joint versions for lock-free reads of adjacent buckets. As illustrated, the chained associative hopscotch hashing algorithm can use associativity to amortize the space overhead of chaining and object metadata across several key-value pairs. Each bucket can correspond to a graph object. Each bucket can have a number of slots equal to half of the number of objects that can be stored in a bucket that store key-value pairs. The chained associative hopscotch hashing algorithm can enable a key-value pair to be stored in the key's bucket or in a next bucket. In at least one example, the chained associative hopscotch hashing algorithm can use an overflow chain per bucket. If an insert fails to move an empty bucket into the right neighborhood, the algorithm can add a key-value pair to the overflow chain of the key's bucket instead of resizing the table. This can also enable the establishing of a limit to the length of linear probing during inserts. Overflow blocks also store several key-value pairs (e.g., two, three, four, etc.) to improve performance and space efficiency.

In some examples, the shared memory module 120 can include tree(s) 204. FIG. 2 shows a non-limiting example of a b-tree 212. B-trees can have more or fewer nodes and/or layers of nodes than are illustrated in FIG. 2. The b-tree 212 can use fence keys to perform lock-free reads. For instance, in a b-tree 212, each node (e.g., node A, node B, node A(1), node A(2), node B(1), node B(2), etc.) except the root (e.g., root) can have two separator keys stored in its parent node that define the range of keys owned by the child node. As a non-limiting example, the root node is a parent node to nodes A and B, node A is a parent node to nodes A(1) and A(2), node B is a parent node to nodes B(1) and B(2), etc. With fence keys, a copy of the separator keys can be stored in the child node in addition to the corresponding parent node.

The shared memory module 120 can traverse from parent node to child node to determine whether the keys match. Based on determining that the keys do not match, the shared memory module 120 can determine that inconsistency is detected and can re-read the parent node and the child node. This process can be particularly useful for caching b-tree internal nodes locally to reduce the size and the number of RDMAs used to perform the low latency messaging between servers in the cluster of servers 110. For example, the cached copies of nodes can become stale without any synchronization with the actual node. The fence key consistency check mechanism is able to detect an inconsistency, at which point the shared memory module 120 can remove the inconsistent parent node and child node from the cache and re-read the parent node and child node from FaRM 115. If all the internal nodes (e.g., nodes between the root node and the leaf nodes) are cached and there is no inconsistency, then a leaf node can be read over RDMA.

In at least one example, if the transaction module 118 is looking up a single key, validation may not be required and the lookup can be completed with a single RDMA read. In an alternative example, if the transaction module 118 reads other objects (in the same b-tree or elsewhere) validation can be performed. In such examples, but for the b-tree lookup, validation can include validating the leaf node and not any internal nodes (whether they can be read from the cache or over RDMA).

The linked list(s) 206 can provide a list interface with multiple items stored in each node of the linked list, as described above. In at least one example, a linked list 206 can include a chain of FaRM objects and each FaRM object can reference objects associated with another FaRM object and a neighboring FaRM object in the chain. A neighboring FaRM object can be a next or previous FaRM object relative to the other FaRM object. The linked list(s) 206 can prevent direct offsets or jumps to particular FaRM objects and can facilitate forward and backward pointer following.

The shared memory module 120 can also include a catalog 208. In at least one example, the catalog 208 can be a bootstrapping data structure, similar to a database catalog, which allows names to be attached to specific data structures. The catalog can be a global FaRM distributed data structure that allows the shared memory module 120 to lookup various catalog objects by name. Examples of catalog objects include tenant profile(s) 214, FaRM object(s) 216, etc. In at least one example, the catalog 208 can be utilized in a manner that is analogous to the database catalogs where database table definitions are kept. In at least some examples where the catalog 208 is a distributed data structure, the shared memory module 120 can cache the catalog objects in memory to speed up lookups. When a catalog object is modified or deleted, the shared memory module 120 can invalidate the cache to prevent using a stale object from the catalog 208. The catalog 208 can also be used to answer list queries like enumerating one or more graphs for a single tenant.

In at least one example, the graph database 116 described herein can be a multi-tenant system where multiple users 106 can store their data. Therefore, for illustrative purposes, a tenant profile 214 can be used to separate the data for each user 106. Each user 106 can be assigned a tenant identification (ID) and all operations associated with a particular user 106 can execute in the context of a single tenant profile 214. In at least one example, no single operation touches the data of more than one tenant profile 214. A single tenant profile 214 can be associated with one or more graphs in the graph database 116. In some examples, names of the one or more graphs can be unique within the tenant profile 214.

As described above, the graph database 116 can include one or more graphs. Each graph can include graph objects such as a plurality of vertices connected via one or more edges. In at least one example, graph objects like vertices and edges can have an associated type (e.g., person, photo, post, etc. for a social graph). Each type can be used to enforce a schema for data associated with a corresponding vertex or edge. In an example, the schema definition can be encoded using a mechanism for processing schematized data (e.g., MICROSOFT® Bond, GOOGLE® Protocol Buffers, FACEBOOK® Thrift, Avro, etc.). In at least one example, type names and their associated schema definitions can be stored in the catalog 208 with corresponding FaRM object(s) 216. In at least one example, when a user 106 creates a vertex of a certain type, the shared memory module 120 can use the catalog 208 to lookup the associated schema for that type and verify that the supplied data matches the schema definition. In at least one example, an API call on a graph can require a lookup of the associated schema. The shared memory module 120 can cache the schema definitions from the catalog.

Figure 3:
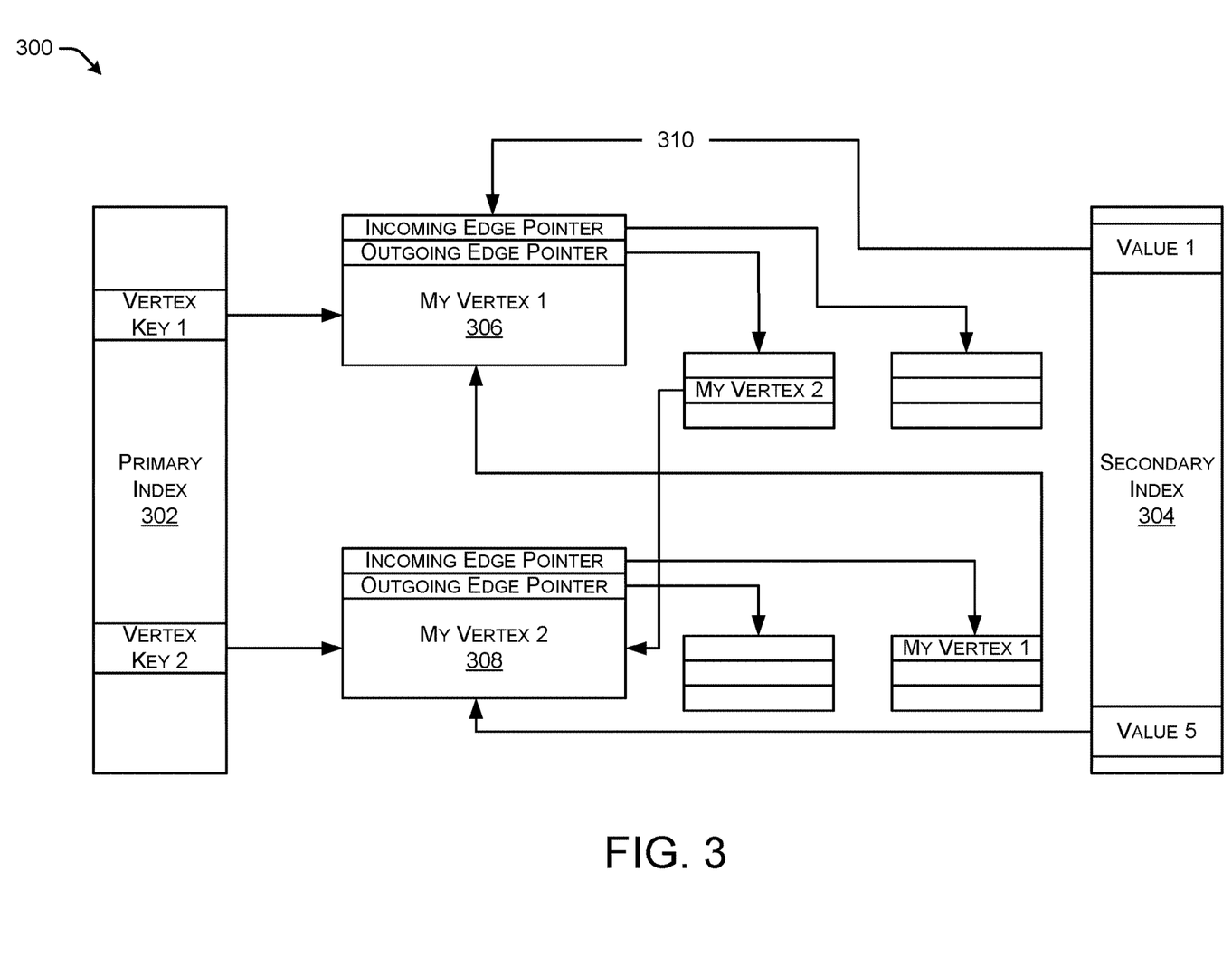
FIG. 3 is a schematic diagram showing an example data layout associated with a high performance and scalable distributed graph database including vertices, edges, and indices.

At least some of FaRM object(s) 214 can include graph objects (e.g., vertex objects, edge objects, etc.) and indices that can be used to generate the graphs stored in the graph database 116. Each graph object can be uniquely identified by human readable names and can include metadata information about the graph object and/or corresponding graph such as, for example, a FaRM pointer to the primary index for the graph, any secondary indices being used by it, etc. Additionally and/or alternatively, the metadata can identify a creation time or deletion time via a timestamp, an owner of the graph object, etc. The overall relation between vertices, edges, and primary/secondary indices is shown in FIG. 3. Each of the data items illustrated in FIG. 3 can be stored in the catalog 208.

FIG. 3 illustrates an example data layout 300 associated with the high performance and scalable distributed graph database including a primary index 302, secondary index 304, vertices (e.g., my vertex 1 306, my vertex 2 308, etc.), and edges (e.g., edge 310). In at least one example, the base data structure to which a graph in the graph database 116 is mapped can be the primary index (e.g., primary index 302) for vertices. In at least one example, the primary index can be a b-tree in FaRM 115 (e.g., b-tree 212). The b-tree can map vertex keys to a FaRM pointer for the corresponding vertex object. Primary indices (e.g., primary index 302) can be unique such that a vertex key can be mapped to a single value and each value can be mapped to a single vertex key. The edge objects associated with the vertex object can be stored as adjacency lists attached to the vertex object in the shared memory module 120. Secondary indices (e.g., secondary index 304) can index the data contained within a vertex object and can also store FaRM pointers for the relevant vertex objects. Secondary indices (e.g., secondary index 304) can be created for either vertex data or edge data when a graph is created, or after the graph has been created. The secondary indices (e.g., secondary index 304) can be specified on the values for a specific column or a composite of columns. Unlike primary indices (e.g., primary index 302), secondary indices (e.g., secondary index 304) may not be unique. Since FaRM provides transactional updates, secondary indices (e.g., secondary index 304) can be updated synchronously with the vertex data and hence can be substantially consistent. In at least one example, when a secondary index 304 is created after the graph has already been populated, the secondary index 304 can be populated asynchronously over time and during that ramp-up time.

In at least one example, a vertex object (e.g., my vertex 1 306, my vertex 2 308, etc.) can be of fixed size and can contain any combination of one or more of the following data fields:
- a unique identification (ID);
- a timestamp when the vertex object was created;
- a timestamp when the vertex object was marked deleted, if the vertex object is marked as deleted;
- a FaRM pointer to an incoming adjacency edge list;
- a FaRM pointer to an outgoing adjacency edge list;
- a vertex type;
- a FaRM pointer to unversioned data associated with the vertex object; and
- a FaRM pointer to versioned data associated with the vertex object.

Figure 4:
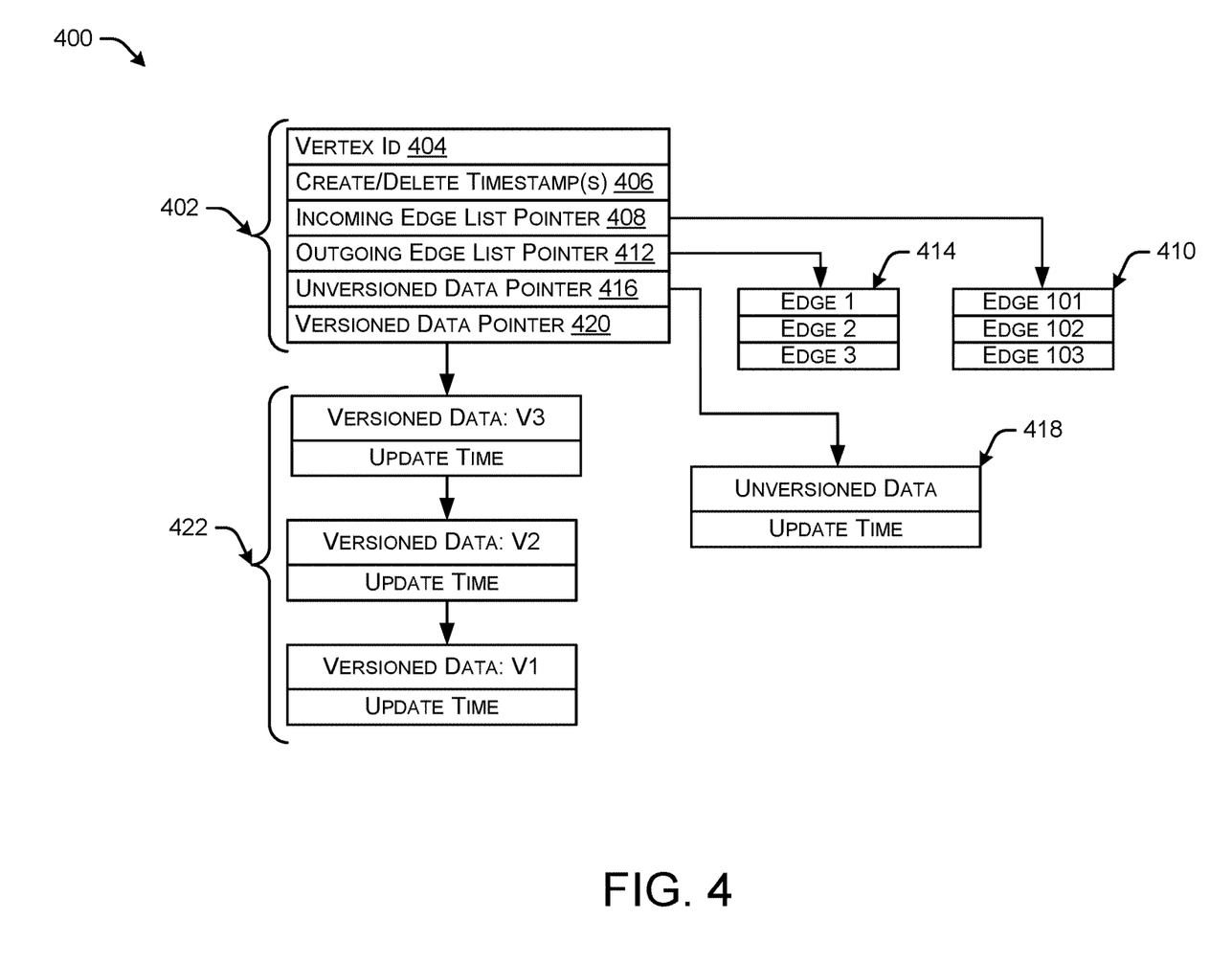
FIG. 4 is a schematic diagram showing an example data layout for vertex objects including versioned data and unversioned data.

In at least one example, a vertex object can include both versioned and unversioned data. For unversioned data, more than the most recent version can be stored with the version's timestamp. The data can be serialized using the mechanism for processing schematized data, described below, for the vertex object and stored as a separate object in the catalog 208. The vertex object can include a FaRM pointer to the serialized object in FaRM 115. In some examples, historical versions can be maintained for the versioned data, which can be stored, for example, as a linked list 206 with the head of the list containing the most recent data. In such examples, this data can be stored as a separate linked list 206 and the vertex object may only contain a FaRM pointer to it, as described above.

FIG. 4 illustrates an example data layout 400 for vertex objects including versioned data. In FIG. 4, the represented vertex object 402 is associated with various data fields as described above. For instance, a unique identifier (vertex ID 404), a create and/or delete timestamp 406, a FaRM pointer 408 to an incoming adjacency edge list 410, a FaRM pointer 412 to an outgoing adjacency edge list 414, a FaRM pointer 416 to unversioned data 418 associated with the vertex object, and a FaRM pointer 420 to versioned data 422 associated with the vertex object.

In most graphs the size of different vertices can be very different, and the outliers (e.g., large vertices) can be a problem for performance of different graph operations. In a non-limiting example, in a social graph, an average person has 5-10 friends. However, some users in the graph have millions of friends (e.g., celebrities). In at least one example, to optimize a layout of large vertices, special edge indices can be created within a large vertex based on edge types, edge data, or neighboring vertex data of the large vertex. In an example, for large user data objects, an index of fields can be computed and offsets of frequently used fields can be stored in a header.

Figure 5:
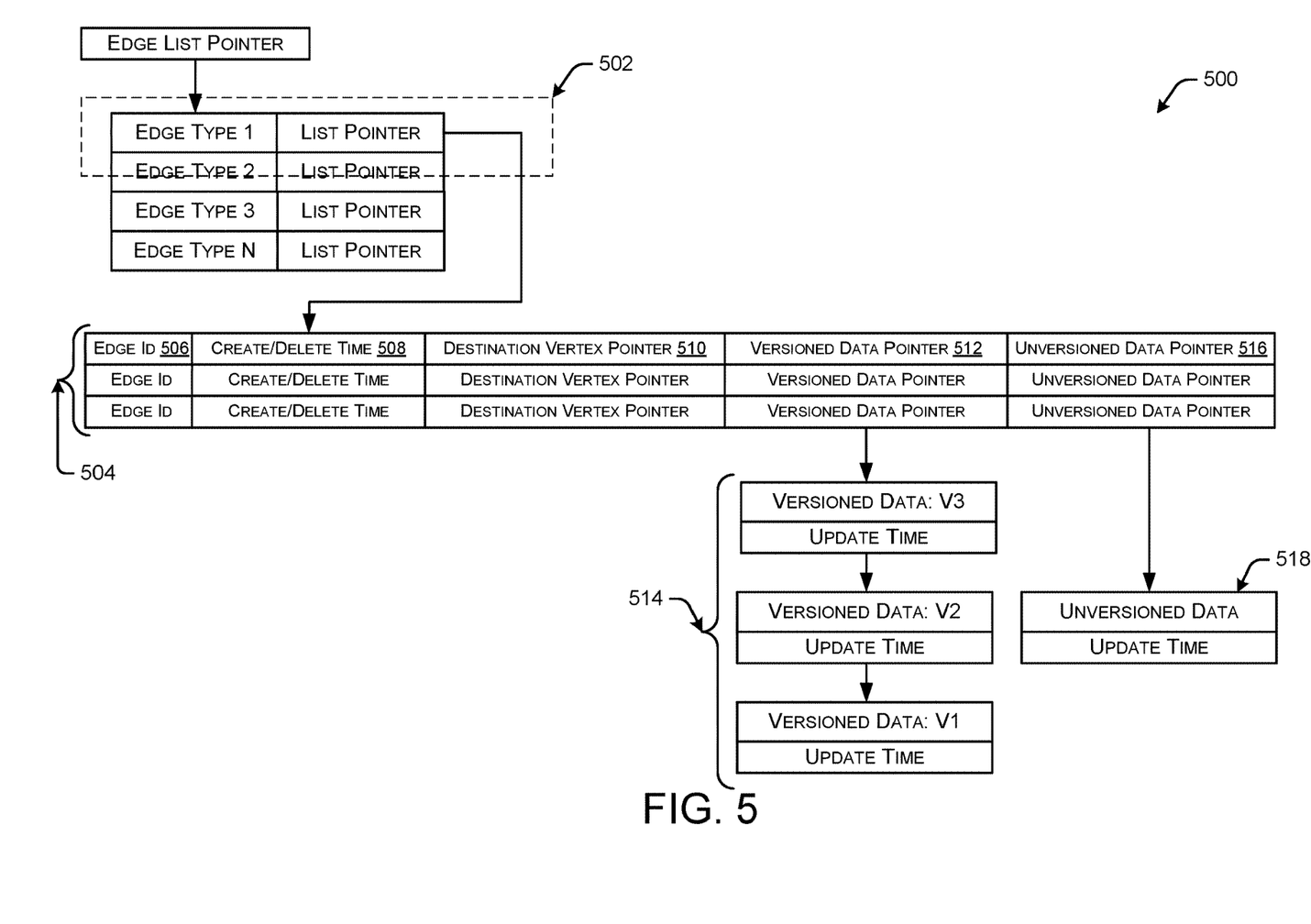
FIG. 5 is a schematic diagram showing an example data layout for edge lists and edge objects including versioned data and unversioned data.

Unlike vertex objects, edges may not be stored as single objects. Given an edge from vertex A to vertex B with some associated data, there can be a reference to the edge in the adjacency list of both A and B. In at least one example, the edge can be stored in both adjacency lists to represent the existence of the edge AB starting from either vertex object. The edge adjacency list for a vertex object can be organized as a list of lists. Given a set of edges of different types for a vertex object, the shared memory module 120 can group the edges by type and store each set of edges of a single type in an edge list. In turn, these edge lists are stored in another list. As a non-limiting example, in a social graph for a user 106, friend edges (representing friends of the person) and post edges (representing social media posts by, or associated with, the person) can be organized in two separate lists. This way, the shared memory module 120 can quickly look up all friends of a person without wading through a mass of posts.

In at least one example, an edge object in an edge list can have fixed size and can store any combination of one or more of the following fields:
- a unique identification (ID) for the edge object;
- a timestamp when the edge object was created;
- a timestamp when the edge object was marked deleted, if the edge object is marked as deleted;
- a FaRM pointer to a destination vertex object;
- a FaRM pointer to unversioned data for the edge object; and
- a FaRM pointer to versioned data for the edge object.

FIG. 5 illustrates an example data layout 500 for edge lists and edge objects including versioned data. In FIG. 5, edge type 1 and the corresponding list pointer can represent an edge object 502. The edge object 502 can be mapped to a particular portion of an edge list 504. In FIG. 5, the represented edge object 502 is associated with various data fields as described above. For instance, a unique identifier (edge ID 506), a create and/or delete timestamp 508, a FaRM pointer 510 to a destination vertex object, a FaRM pointer 512 to versioned data 514 associated with the vertex object, a FaRM pointer 516 to unversioned data 518 associated with the vertex object, etc.

In at least one example, default serialization protocols provided in mechanisms for processing schematized data (e.g., MICROSOFT® Bond, GOOGLE® Protocol Buffers, FACEBOOK® Thrift, Avro, etc.) can be used for storing data, which can utilize full serialization and deserialization of the graph object(s) 216 when the transaction module 118 writes and/or reads the data. In other examples, an optimized serialization protocol can be utilized for faster deserialization of fields. In such examples, the shared memory module 120 can precompute the offsets of all fixed-length fields in a graph object. In other examples, a user 106 can inline frequently used user-data fields into the vertex objects and/or edge objects itself. In an example, these data layout determinations can be made up-front when the user 106 first creates the type and schema for the object and then applied during data storage and retrieval.

Example Processes

Figure 6:
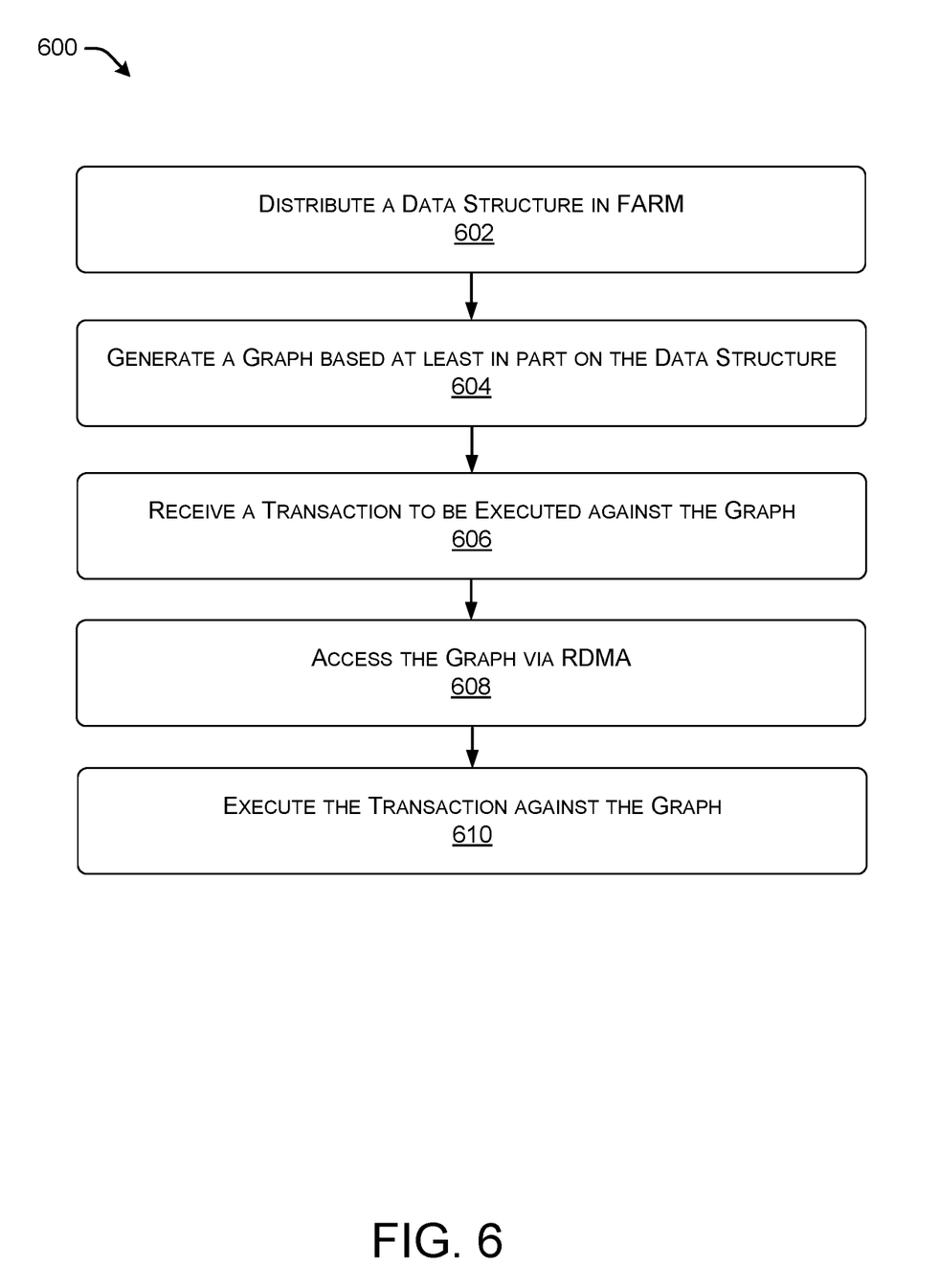
FIG. 6 is a flow diagram that illustrates an example process to distribute a data structure in FaRM and leverage the data structure to generate a graph that can be utilized for executing transactions via RDMA.

FIG. 6 illustrates an example process 600 to distribute a data structure in FaRM 115 and leverage the data structure to generate a graph that can be utilized for executing transactions via RDMA.

The process described in FIG. 6 below is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Block 602 illustrates distributing a data structure in FaRM 115. As described above, the shared memory module 120 can store one or more data structures that can be used for indexing graph objects and retrieving graph objects in a particular order and building a graph. FIG. 2, described above, is a schematic diagram 200 showing an example of data structures that can be associated with the shared memory module 120. The data structures can include, but are not limited to, hash table(s) 202 and/or map(s), tree(s) 204 (e.g., b-trees, etc.), linked list(s) 206, and a catalog 208. In at least one example, the technologies described herein can utilize special versions of these data structures that are capable of scaling by using the transactional memory fabric provided, and can be optimized to minimize the number of RDMA operations involved, as described above. In at least one example, the data structure can be distributed across the cluster of servers 110 according to a locality principle, as described above.

Block 604 illustrates generating a graph based at least in part on the data structure. As described above, the shared memory module 120 can store one or more data structures that can be used for indexing graph objects and retrieving graph objects in a particular order based at least in part on FaRM pointers and/or other references, and building a graph. In at least one example, the graph database 116 can access the catalog 208 stored in the shared memory module 120 and can generate a graph based at least in part on catalog objects stored in the catalog 208. As described above, examples of catalog objects include tenant profile(s) 214, FaRM object(s) 216, etc. In at least one example, the catalog 208 can be utilized in a manner that is analogous to the database catalogs where database table definitions are kept. In at least some examples where the catalog 208 is a distributed data structure, the shared memory module 120 can cache the catalog objects in memory to speed up lookups. When a catalog object is modified or deleted, the shared memory module 120 can invalidate the cache to prevent using a stale object from the catalog 208. The catalog 208 can also be used to answer list queries like enumerating one or more graphs for a single tenant.

The graph database 116 can access the shared memory module 116 to generate a graph that can be stored in the graph database 116. The graph can comprise vertices 124 and edges 126 with a set of properties, as described above. In at least one example, the edges 126 can be directed edges 126 connecting pairs of the vertices 124. Each of the graph objects (e.g., vertices, edges, etc.) can correspond to a FaRM object which can be uniquely identified by a FaRM pointer, as described above. In at least one example, FaRM uses one-way RDMA to read remote graph objects without any processor intervention. In such examples, object incarnation enables the graph database 116 to detect if a graph object has been deleted. For example, when a graph object is first allocated, its incarnation is set to zero and when it is marked as deleted, its incarnation is incremented. Therefore, when a graph object is read using a FaRM pointer, its incarnation indicates whether it is still valid or not. As the graph object goes through cycles of allocation/deallocation the incarnation keeps growing. As described in some examples, FaRM 115 can provide the transaction module 118 with a snapshot view of the graph database 126. In such examples, the transaction module 118 may not observe modifications (e.g., deletions, etc.) by concurrently running transactions and may not rely on object incarnations.

Block 606 illustrates receiving a transaction to be executed against the graph. As described above, the transaction module 118 can perform various transactions such as allocating, reading from, writing to, freeing, etc. FaRM object(s) 216. In at least one example, the search module 128 associated with the transaction module 118 can leverage the transaction module 118 for query processing (e.g., range queries, index queries, etc.), FaRM pointer lookups, scans, etc., as described above.

Block 608 illustrates accessing the graph via RDMA. In at least one example, the transaction module 118 can include a search module 128 that can access the graph(s) in the graph database 116 and perform BFS traversals, DFS traversals, A* traversals, subgraph-match traversals, etc. of the graphs, as described above.

Block 610 illustrates executing the transaction against the graph. The search module 128 can start at a given vertex of a graph in the graph database 116 and iteratively explore its neighborhood for vertices matching certain characteristics, as described above.

In at least one example, the search module 128 can be associated with a single coordinator server which can work both as a query coordinator and as an aggregator. Given an origin vertex, the primary server can be chosen for the vertex as the coordinator server. The filtering criteria within a query might involve filtering against fields specified in the user's data, which can be matched against by deserializing the data using the schema provided by the user 106.

In at least one example, the search module 128 can iteratively traverse a graph using a traversal algorithm, as described above. For instance, in each iteration, the search module 128 can explore one level deeper in a graph. As new vertices are explored in the graph, one or more optional filters can be applied to determine whether the new vertex is added to the next iteration or not. For example, if a user 106 is looking for people in the same city as in the previous query, at every level, the search module 128 can filter out vertices which do not belong in that city. For example, on the first iteration, the search module 128 prepares a list of all the neighbor vertices of the origin vertex, and then determines the primary servers for each neighbor. For the purpose of this discussion, the list can be called the neighbor list. In some examples, the neighbor list can be partitioned according to the primary server and then each partition is handed off to the primary server along with any filter that is applied. In addition, the search module 128 can maintain a list of vertices that have already been visited. Every primary server can iterate through the vertices for which the primary server is responsible and for each iteration, the primary server can apply the relevant filter, retrieve the neighbors to each primary server, and return the neighbor list back to the coordinator server. This step can achieve two optimizations: first, the vertex data and neighbor lists are read at the primary server responsible for that vertex and second, it parallelizes the query across a large number of primary servers.

In at least some examples, there can be a tradeoff between the overhead of shipping the list of neighbors to a remote primary server, and using a RDMA read to fetch the vertex data and process it on the coordinator server itself. For small numbers of vertices being visited, performing RDMA reads usually performs much better than shipping the query. However, for large numbers of vertices being visited, shipping the query can be more efficient. Also, performing RDMA reads may perform better than query shipping when the system is fully loaded or the remote primary server is known to be busy with other work. When performing RDMA reads, the work can also be parallelized using local threads on the coordinator server, as described above.

Once the neighbor list reaches the coordinator server, or is computed locally, the coordinator adds the neighbors to the list of visited vertices and then prepares a next list of vertices to visit. This way the iteration continues until the search module 128 runs out of neighboring vertices that are accessible from the origin vertex.

In additional and/or alternative examples, the transaction module 118, via the search module 128, can perform subgraph-match queries or other queries to execute the transaction against the graph. Furthermore, to exploit locality in data placement, the technologies described herein can leverage a combination of approaches. For small graphs, the search module 128 can locate all data on the same region or server of the plurality of servers 110. For larger graphs, FaRM 115 can partition the data based on heuristics, such as, for example, customer zip code, or other indicators of data locality, identified using hints provided by a user 106, as described above. In some examples, the search module 128 can traverse a graph and move data around to improve locality. Such examples can be useful for stable graphs which can require more read operations compared to changes in the graphs. In at least one example, although two regions which are located on the same server are within a predetermined proximity, the two regions can be moved around after server failure and load balancing thereby causing the two regions to potentially be located outside the predetermined proximity (e.g., the two regions can be arranged such that they are no longer close).

As described above, remote access can accrue latency. Accordingly, in some examples, large data transfers can be more efficient than many small data transfers. Therefore, the search module 128 can leverage data structures, as described herein, which are optimized for as few remote accesses as possible. For instance, b-trees are optimized for as few remote accesses as possible. Similarly in linked lists, multiple items can be stored on a single node to reduce a number of accesses while traversing the list. Additionally and/or alternatively, hash tables and/or maps can be used to minimize the number of remote accesses required for data transfers.

To take advantage of locality, FaRM 115 can leverage both data shipping and query shipping. In at least one example, when data is local to a server of the plurality of servers 110, the search module 128 can execute a query locally. Alternatively, for non-local queries, the search module 128 can ship the query to the remote primary server where it can be executed more efficiently.

Example Clauses

A. A system comprising: a cluster of devices; a remote direct memory access (RDMA)-based communication layer to perform low latency messaging between devices of the cluster of devices; a shared memory layer that provides one or more data structures; a transaction layer that can be used to perform query processing; and a graph database layer stored in computer-readable media and executed on a processor to implement a graph data model, the graph data model being mapped to the one or more data structures.

B. A system as paragraph A recites, wherein the RDMA-based communication layer further performs replication of memory regions between the devices of the cluster of devices without involving processors associated with the devices of the cluster of devices.

C. A system as paragraph A or paragraph B recites, wherein the one or more data structures include at least one of a b-tree, a hash table, a linked list, or a catalog.

D. A system as paragraph C recites, wherein the hash table utilizes a changed associative hopscotch hashing algorithm to balance space efficiency and a size and a number of RDMAs used to perform the low latency messaging between the devices.

E. A system as paragraph C recites, wherein the b-tree utilizes fence keys to perform lock-free reads for reducing a size and a number of RDMAs used to perform the low latency messaging between the devices.

F. A system as paragraph C recites, wherein the b-tree provides a key-value store that iterates over a range.

G. A system as any of paragraphs A-F recite, wherein the graph data model comprises: a plurality of vertices; and one or more directed edges each connecting pairs of vertices of the plurality of vertices.

H. A system as any of paragraphs A-G recite, further comprising a co-processor layer, the co-processor layer comprising at least one of a trusted co-processor, an untrusted hosted co-processor, or an untrusted frontend-hosted co-processor.

I. A method for distributing a data structure across a cluster of devices to enable scaling and efficient processing, the method comprising: distributing the data structure across the cluster of devices in a shared transactional memory layer; generating a graph based at least in part on the data structure; receiving a transaction to be executed against the graph; and using remote direct memory access (RDMA) to execute the transaction against the graph.

J. A method as paragraph I recites, wherein the data structure is at least one of a hash table, a b-tree, a linked list, or a catalog.

K. A method as either paragraph I or J recites, wherein the graph comprises: a plurality of vertices; and one or more directed edges, wherein a directed edge connects a first vertex of the plurality of vertices to a second vertex of the plurality of vertices.

L. A method as paragraph K recites, wherein the plurality of vertices and the one or more directed edges are mapped to the data structure.

M. A method as any of paragraphs I-L recite, wherein: the transaction comprises a query; and the method further comprises executing the transaction based at least in part on a breath-first-search query.

N. A method as paragraph M recites, wherein the breath-first-search query comprises: accessing a node of the graph; and iteratively processing a plurality of nodes around the node to determine characteristics that match the node.

O. A method as any of paragraphs I-N recite, wherein distributing the data structure across the cluster of devices comprises distributing data structure objects according to a locality principle.

P. A method as paragraph O recites, wherein distributing the data structure objects according to the locality principle comprises: based at least in part on determining that a data structure object of the data structure objects can be placed in a same region as another data structure object, placing the data structure object within the same region as the other data structure object; based at least in part on determining that it is not possible to place the data structure object within the same region as the other data structure object, placing the data structure object within a same device as the other data structure object; and based at least in part on determining that it is not possible to place the data structure object within the same device as the other data structure object, placing the data structure object within a device on a same physical rack as a device in which the other data structure object is located.

Q. One or more computer-readable media encoded with instructions that, when executed by a processor, configure a computer to perform a method as any of paragraphs I-P recite.

R. A device comprising one or more processors and one or more computer-readable media encoded with instructions that, when executed by the one or more processors, configure a computer to perform a computer-implemented method as any of paragraphs I-P recite.

S. A method for distributing a data structure across a cluster of devices to enable scaling and efficient processing, the method comprising: means for distributing the data structure across the cluster of devices in a shared transactional memory layer; means for generating a graph based at least in part on the data structure; means for receiving a transaction to be executed against the graph; and means for using remote direct memory access (RDMA) to execute the transaction against the graph.

T. A method as paragraph S recites, wherein the data structure is at least one of a hash table, a b-tree, a linked list, or a catalog.

U. A method as either paragraph S or T recites, wherein the graph comprises: a plurality of vertices; and one or more directed edges, wherein a directed edge connects a first vertex of the plurality of vertices to a second vertex of the plurality of vertices.

V. A method as paragraph U recites, wherein the plurality of vertices and the one or more directed edges are mapped to the data structure.

W. A method as any of paragraphs S-V recite, wherein: the transaction comprises a query; and the method further comprises means for executing the transaction based at least in part on a breath-first-search query.

X. A method as paragraph W recites, wherein the breath-first-search query comprises: accessing a node of the graph; and iteratively processing a plurality of nodes around the node to determine characteristics that match the node.

Y. A method as any of paragraphs S-X recite, wherein distributing the data structure across the cluster of devices comprises distributing data structure objects according to a locality principle.

Z. A method as paragraph Y recites, wherein distributing the data structure objects according to the locality principle comprises: based at least in part on determining that a data structure object of the data structure objects can be placed in a same region as another data structure object, placing the data structure object within the same region as the other data structure object; based at least in part on determining that it is not possible to place the data structure object within the same region as the other data structure object, placing the data structure object within a same device as the other data structure object; and based at least in part on determining that it is not possible to place the data structure object within the same device as the other data structure object, placing the data structure object within a device on a same physical rack as a device in which the other data structure object is located.

AA. A system comprising: a cluster of devices, wherein individual devices of the cluster of devices include: one or more processors; a portion of a shared transactional memory associated with the cluster of devices, the portion of the shared transactional memory including a portion of a data structure that is distributed across the cluster of devices and is accessible by the cluster of devices via remote direct memory access (RDMA) reads; and a local memory that stores one or more graphs generated based at least in part on the data structure associated with the shared transactional memory.

AB. A system as paragraph AA recites, wherein the shared transactional memory is configured to: receive a transaction to be executed against a graph of the one or more graphs; and utilize the RDMA to execute the transaction against the graph.

AC. A system as paragraph AB recites, wherein the shared transactional memory implements efficient non-uniform memory access (NUMA)-aware multiplexing to improve execution of the transaction against the graph.

AD. A system as any of paragraphs AA-AC recite, wherein the shared transactional memory comprises a petabyte transactional memory storage layer.

CONCLUSION

Although the present disclosure may use language that is specific to structural features and/or methodological acts, the invention is not limited to the specific features or acts described herein. Rather, the specific features and acts are disclosed as illustrative forms of implementing the invention.

We claim:
1. A system comprising:
a cluster of devices;
a remote direct memory access (RDMA)-based communication layer to perform messaging between devices of the cluster of devices; a shared memory layer that provides one or more data structures;
a transaction layer that can be used to perform query processing; and a graph database layer stored in computer-readable storage media and executed on a processor to implement a graph data model of data structure objects, the graph data model being mapped to the one or more data structures, wherein a respective data structure object of the data structure objects is stored in a first device of the cluster of devices and is uniquely identified by a pointer accessible to the transaction layer, the pointer including an incarnation for the respective data structure object;

wherein the graph data model and the pointer is stored at a second device of the cluster of devices;

wherein the respective data structure object located on the first device is verified as valid based on the incarnation for the respective data structure object; and wherein the transaction layer is configured to identify that a data structure object of the graph data model is located on the first device using the graph data model and the pointer stored at the second device, and process a query from the second device related to the data structure object on the first device after the data structure object is located on the first device using the pointer.

2. A system as claim 1 recites, wherein the RDMA-based communication layer further performs replication of memory regions between the devices of the cluster of devices without involving processors associated with the devices of the cluster of devices.

3. A system as claim 1 recites, wherein the one or more data structures include at least one of a b-tree, a hash table, a linked list, or a catalog.

4. A system as claim 3 recites, wherein the hash table utilizes a changed associative hopscotch hashing algorithm to balance space efficiency and a size and a number of RDMAs used to perform the messaging between the devices.

5. A system as claim 3 recites, wherein the b-tree utilizes fence keys to perform lock-free reads for reducing a size and a number of RDMAs used to perform the messaging between the devices.

6. A system as claim 3 recites, wherein the b-tree provides a key-value store that iterates over a range.

7. A system as claim 1 recites, wherein the graph data model comprises:
a plurality of vertices; and
one or more directed edges each connecting pairs of vertices of the plurality of vertices.

8. A system as claim 1 recites, further comprising a co-processor layer, the co-processor layer comprising at least one of a trusted co-processor, an untrusted hosted co-processor, or an untrusted frontend-hosted co-processor.

9. A method comprising:
distributing a data structure across a cluster of devices in a shared transactional memory layer;
generating a graph of data structure objects based at least in part on the data structure, wherein a respective data structure object of the data structure objects is stored in a first device of the cluster of devices and is uniquely identified by a pointer accessible to the shared transactional memory layer, the pointer including an incarnation for the respective data structure object;
storing the graph and the pointer at a second device;
receiving a transaction to be executed against a data structure object of the graph;
identifying, at the second device, that the data structure object is located on the first device using the graph and the pointer stored at the second device;
verifying that the data structure object located on the first device is valid based on the incarnation for the respective data structure object; and
using remote direct memory access (RDMA) to execute the transaction from the second device against the data structure object of the graph on the first device after identifying the data structure object is located on the first device using the pointer.

10. A method as claim 9 recites, wherein the data structure is at least one of a hash table, a b-tree, a linked list, or a catalog.

11. A method as claim 9 recites, wherein the graph comprises:
a plurality of vertices; and
one or more directed edges, wherein a directed edge connects a first vertex of the plurality of vertices to a second vertex of the plurality of vertices.

12. A method as claim 11 recites, wherein the plurality of vertices and the one or more directed edges are mapped to the data structure.

13. A method as claim 9 recites, wherein:
the transaction comprises a query; and
the method further comprises executing the transaction based at least in part on a breath-first-search query.

14. A method as claim 13 recites, wherein the breath-first-search query comprises:
accessing a node of the graph; and
iteratively processing a plurality of nodes around the node to determine characteristics that match the node.

15. A method as claim 9 recites, wherein distributing the data structure across the cluster of devices comprises distributing the data structure objects according to a locality principle.

16. A method as claim 15 recites, wherein distributing the data structure objects according to the locality principle comprises:
based at least in part on determining that the data structure object of the data structure objects can be placed in a same region as another data structure object, placing the data structure object within the same region as the other data structure object;
based at least in part on determining that it is not possible to place the data structure object within the same region as the other data structure object, placing the data structure object within a same device as the other data structure object; and
based at least in part on determining that it is not possible to place the data structure object within the same device as the other data structure object, placing the data structure object within a device on a same physical rack as a device in which the other data structure object is located.

17. The method of claim 9, wherein the transaction is sent from the second device to the first device for execution at the first device.

18. The method of claim 9, wherein the data structure object is sent from the first device to the second device and wherein the transaction is executed at the second device after the data structure object is received at the second device.

19. A system comprising:
a cluster of devices, wherein individual devices of the cluster of devices include:
one or more processors;
a portion of a shared transactional memory associated with the cluster of devices, the portion of the shared transactional memory including a portion of a data structure that is distributed across the cluster of devices and is accessible by the cluster of devices via remote direct memory access (RDMA) reads; and a local memory that stores one or more graphs of data structure objects generated based at least in part on the data structure associated with the shared transactional memory;

wherein a respective data structure object of the data structure objects is stored in a first device of the cluster of devices and is uniquely identified by a pointer accessible to the shared transactional memory, the pointer including an incarnation for the respective data structure object;

wherein a graph of the one or more graphs and the pointer is stored at a second device of the cluster of devices;

wherein a data structure object of the graph of the one or more graphs is identified as being located on the first device using the graph of the one or more graphs and the pointer stored at the second device; wherein the data structure object located on the first device is verified as valid based on the incarnation for the respective data structure object; and wherein a transaction is executed from the second device against the data structure object by one of the devices of the cluster of devices after the data structure object on the first device is identified as being located on the first device using the pointer.

20. A system as claim 19 recites, wherein the shared transactional memory is configured to:
receive a transaction to be executed against a graph of the one or more graphs; and
utilize the RDMA to execute the transaction against the graph.

21. A system as claim 20 recites, wherein the shared transactional memory implements efficient non-uniform memory access (NUMA)-aware multiplexing to improve execution of the transaction against the graph.

22. A system as claim 19 recites, wherein the shared transactional memory comprises a petabyte transactional memory storage layer.

* * * * *